(12) United States Patent
Gebhard et al.

(10) Patent No.: US 9,539,952 B2
(45) Date of Patent: Jan. 10, 2017

(54) ROTATABLE OPTICAL DEVICE HOUSING AND MOUNTING PLATFORM

(75) Inventors: Albert W. Gebhard, Denver, CO (US); Colton D. Hosick, Culbertson, NE (US)

(73) Assignee: Golight, Inc., Culbertson, NE (US)

( * ) Notice: Subject to any disclaimer, the term of this patent is extended or adjusted under 35 U.S.C. 154(b) by 247 days.

(21) Appl. No.: 14/344,020

(22) PCT Filed: Sep. 7, 2012

(86) PCT No.: PCT/US2012/054317
§ 371 (c)(1),
(2), (4) Date: Jun. 3, 2014

(87) PCT Pub. No.: WO2013/036876
PCT Pub. Date: Mar. 14, 2013

(65) Prior Publication Data
US 2014/0204218 A1    Jul. 24, 2014

Related U.S. Application Data

(60) Provisional application No. 61/532,494, filed on Sep. 8, 2011.

(51) Int. Cl.
*B60R 11/00* (2006.01)
*F21S 10/06* (2006.01)
(Continued)

(52) U.S. Cl.
CPC ............ *B60R 11/00* (2013.01); *F21S 10/06* (2013.01); *F21V 21/14* (2013.01); *F21V 29/004* (2013.01);
(Continued)

(58) Field of Classification Search
CPC .......... B60Q 1/245; F21V 21/14; F21V 21/30; B60R 11/00; B60R 2011/0042; F21S 10/06; H04N 2005/2255; H04N 5/2252
See application file for complete search history.

(56) References Cited

U.S. PATENT DOCUMENTS 4,728,839 A    3/1988   Coughlan et al.
5,490,046 A    2/1996   Gohl et al.
(Continued)

FOREIGN PATENT DOCUMENTS

EP    0643257 A1    3/1995
EP    1001212       5/2000
(Continued)

OTHER PUBLICATIONS

International Search Report and Written Opinion of the International Searching Authority in International application No. PCT/US2012/054317 mailed on Feb. 25, 2013. (13 pages—see entire document).

(Continued)

*Primary Examiner* — Karabi Guharay
(74) *Attorney, Agent, or Firm* — Polson Intellectual Property Law, PC; Margaret Polson

(57) ABSTRACT

A rotatable optical device housing and mounting platform is disclosed. The optical device housing includes a bezel, front housing and rear housing. The optical device housing can include a number of lighting devices, including light-emitting diodes (LEDs), high-intensity discharge (HID) lamps, halogen lights, incandescent lights, or imaging devices, such as cameras, while utilizing the same bezel, front housing and rear housing. The depicted device can include a vertical tilt, which is adjustable either manually or electronically. A slip ring system provides continuous 360 rotation ability, with controllable and adjustable speed settings. Alternatively, a stop can be used instead of the slip ring, wherein the stop serves as a point of reversal of the unit's rotation. The unit contains an optional home position, allowing a user to select (Continued)

a point in the horizontal rotation to which the unit will return at the touch of a button.

16 Claims, 13 Drawing Sheets

(51) Int. Cl.
    *F21V 29/70*     (2015.01)
    *F21V 21/14*     (2006.01)
    *F21V 29/00*     (2015.01)
    *F21V 29/02*     (2006.01)
    *H04N 5/225*     (2006.01)
    *H04N 5/33*     (2006.01)
    *F21V 21/30*     (2006.01)
    *B60Q 1/24*     (2006.01)

(52) U.S. Cl.
    CPC ............... *F21V 29/02* (2013.01); *F21V 29/70* (2015.01); *H04N 5/2252* (2013.01); *H04N 5/33* (2013.01); *B60Q 1/245* (2013.01); *F21V 21/30* (2013.01)

(56) References Cited

U.S. PATENT DOCUMENTS

| | | |
|---|---|---|
| 5,673,989 A | 10/1997 | Gohl et al. |
| 5,740,580 A | 4/1998 | Leu et al. |
| 6,461,009 B2 | 10/2002 | Smith |
| 6,789,912 B2 | 9/2004 | Smith |
| 6,955,447 B2 | 10/2005 | Lui |
| 7,862,197 B2 | 1/2011 | Gebhard |
| 7,874,709 B1 | 1/2011 | Beadle |
| 8,201,974 B1 | 6/2012 | Smith et al. |
| 8,708,535 B2 | 4/2014 | Dalsgaard |
| 2005/0047142 A1 | 3/2005 | Lui |
| 2008/0043098 A1 | 2/2008 | Leblanc |
| 2009/0323363 A1 | 12/2009 | Evans |
| 2010/0014289 A1 | 1/2010 | Thomas et al. |
| 2010/0067234 A1 | 3/2010 | Gebhard |
| 2014/0126214 A1 | 5/2014 | Gebhard et al. |
| 2014/0146544 A1 | 5/2014 | Gebhard et al. |
| 2014/0177258 A1 | 6/2014 | Gebhard et al. |

FOREIGN PATENT DOCUMENTS

| | | |
|---|---|---|
| FR | 2838178 A1 | 10/2003 |
| KR | 10-0981920 B1 | 9/2010 |
| WO | 2010069327 A1 | 6/2010 |
| WO | 2011100972 | 8/2011 |

OTHER PUBLICATIONS

International Preliminary Report on Patentability in International application No. PCT/US2012/054317 completed on Dec. 24, 2013. (20 pages—see entire document).

Office action dated Jun. 28, 2016 in related Chinese application 201280044021.2, international filing date Sep. 7, 2012.

ROTATABLE OPTICAL DEVICE HOUSING AND MOUNTING PLATFORM

CROSS REFERENCE APPLICATIONS

This application is a non-provisional application claiming the benefit of provisional application No. 61/532,494 filed Sep. 8, 2011, the disclosure of which is hereby incorporated by reference for all purposes.

BACKGROUND

Rotatable lights, pan and tilt assemblies, and mounting systems are known in the art. Existing systems are limited, however, to single-use applications. Stated differently, each housing could only accommodate a single device, such as a light or camera. Interchangeability of these devices is not possible in prior art systems. Further, continuous horizontal rotation is not provided, nor does a user have the ability to select the speed at which horizontal rotation occurs. Units which provide vertical tilt and rotation do not allow manual manipulation to adjust the vertical angle or rotate the unit without causing potential harm to the unit and its drive systems.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The disclosed device is designed to accommodate a number of systems. Selected systems can include light-emitting diodes (LEDs), high-intensity discharge (HID) lamps, halogen lights, cameras or infra red or heat sensitive devices. Optionally, a powered vertical tilt may be included which can be manually adjusted without harm to the unit. In one embodiment, a continuous 360° rotation ability is provided. Alternatively, a limited stop to stop capability may be provided. A user has the ability to select a speed for the rotation, in addition to selecting a home position, to which the unit will return at the touch of a button.

The disclosed device has a simple and weather proof design, which allows for easy assembly and maintenance. A device according to the present disclosure provides improved durability and weather resistance.

A rotatable mounting system is disclosed. The mounting system comprises a base gasket, a base plate mounted on said base gasket, a base mounted on said base plate, a bearing rotatably mounted on said base, a lower yoke mounted over said bearing, a horizontal gear rotatably mounted to said lower yoke, an upper yoke mounted over said horizontal gear. The upper yoke comprises a first arm and a second arm. The first arm comprises a horizontal motor. The second arm comprises a vertical tilt motor. An optical device housing means is also disclosed. The housing means is pivotally connected to the first arm and the second arm. Means for the horizontal motor to turn said horizontal gear and means for the vertical motor to tilt the housing means vertically are also disclosed.

The optical device housing means comprises a rear housing, a front housing, a bezel and an optical device mounted in said optical device housing. The optical device may comprise a heat sink, a length of printed circuit board mounted to said heat sink, at least one light-emitting diode mounted to said printed circuit board, a lens mounted over said printed circuit board, wherein the bezel connects the lens and the heat sink to the front housing. In another embodiment, the optical device comprises a halogen lamp gasket, a halogen lamp, wherein the bezel connects halogen lamp to the front housing. In a second alternate embodiment, the optical device comprises a high-intensity discharge lamp, a ballast powering said high-intensity discharge lamp and the bezel connects the high-intensity discharge lamp to the front housing. In a third alternative embodiment, the optical device comprises a night vision infrared camera, a bracket supporting the night vision infrared camera and the bezel connects the night vision infrared camera to the front housing.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
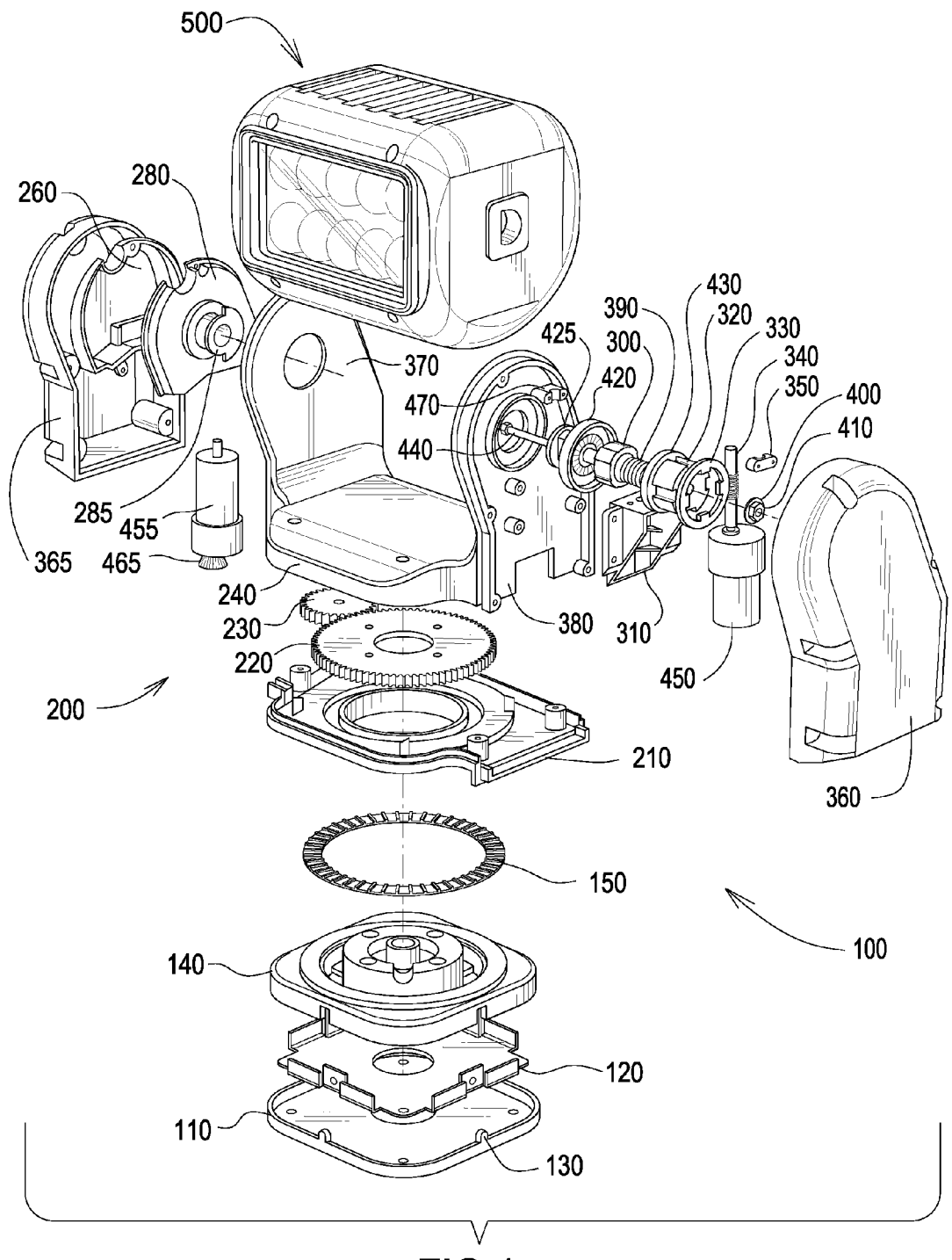
FIG. 1 is an exploded view of the rotating/tilting platform and mounting system of the present application.

Turning first to FIG. 1, an exploded view of the base assembly 100 is shown. A base plate 120 rests on a gasket 110. In use, base plate is permanently attached to a vehicle by four screws (not shown). The unit can be hardwired to the vehicle and operated using a joystick (not shown). A radio receiver and transmitter is an alternate method of communicating with the unit. While screws are described, one having an ordinary level of skill in the art will understand that alternate fasteners could be used and still be within the scope of the disclosure. Gasket 110 includes flaps 130 which cover the screws (not shown) that retain the entire assembly to the base plate after assembly. In the depicted embodiment, gasket 110 comprises rubber. One having an ordinary level of skill in the art will understand that other materials having similar properties to rubber could be substituted. The entire assembled device is attached or removed easily by use of the four lateral screws into the base plate 120. A base 140 is mounted on top of base plate 120. In the depicted embodiment, base 140 comprises carbon fiber filled plastic. In the depicted embodiment, the plastic is acrylonitrile butadiene styrene (ABS). One skilled in the art will understand that other materials having similar strength and durability to carbon fiber filled plastic could be substituted and still be within the scope of the disclosure. A unique wiper bearing 150 is mounted on base 140. In use, wiper bearing 150 wipes the bearing surface clean as it rotates. Because of its unique design, the bearing cleans both bearing surfaces and maintains proper compression between the base 140 and the entire upper assembly beginning with the lower yoke 210. In the depicted embodiment, wiper bearing 150 comprises a very high molecular weight polyethylene. One having an ordinary level of skill in the art will understand that other materials having similar properties to polyethylene are contemplated by this disclosure.

FIG. 1 depicts a first embodiment of a yoke assembly 200. In yoke assembly 200, lower yoke 210 sits on top of wiper bearing 150. Horizontal gear 220 is attached to lower yoke 210 by four screws (not shown). While screws are depicted, one having ordinary skill in the art will understand that alternate fasteners could be used and still be within the scope of the present disclosure. Lower yoke 210 and wiper bearing 150 are compressed and held together by the four screws holding down horizontal gear 220. Idler gear 230 is mounted adjacent to horizontal gear 220. Horizontal motor and gear box 250 is mounted in upper yoke 240 in motor mount 245 (not visible in FIG. 1). Electronics, speed control and radio receiver are located inside the enclosure formed by housing outer shell 260, housing inner shell 280 and fixed pivot (not shown). Upper yoke 240 engages with base 140 to enclose all the parts in between. Housing assembly 500 mounts in upper yoke 240.

In use, the entire assembly rotates around horizontal gear 220. Power is supplied from horizontal motor 250 to idler gear 230, which engages horizontal gear 220, thereby rotating the entire yoke assembly 200, including housing assembly 500. In one embodiment, yoke assembly 200 rotates 360° continuously. The continuous horizontal rotation of the yoke assembly 200 rotates the optical means in the housing assembly 500 horizontally in a continuous circle, allowing the user to point the optical means in any given horizontal direction. This first embodiment includes an optional speed feature, which allows a user to select the speed of the rotation. A slip ring (not shown) with two wires (not shown) on each side allows for continuous rotation. In this first embodiment, fixed pivot (not shown) can house radio control or a home position electronic component, for example. Opposite this there is a "live" pivot (depicted in FIG. 2) that drives the tilt of housing assembly 500. A home position electronic component would allow a user to select a position in the horizontal rotation of yoke assembly 200 and program the unit to return the yoke assembly 200 to the selected position at the push of a button. A second embodiment omits the slip ring and inserts a stop in its place. In the second embodiment, yoke assembly 200 rotates in a first direction until it contacts the stop. After contacting the stop, yoke assembly 200 will rotate approximately 360° degrees in the opposite direction, or until it contacts the stop. The yoke assembly 200 will then rotate the first direction until contacting the stop again. Stated differently, the stop serves as a point of reversal for yoke assembly 200.

Figure 2:
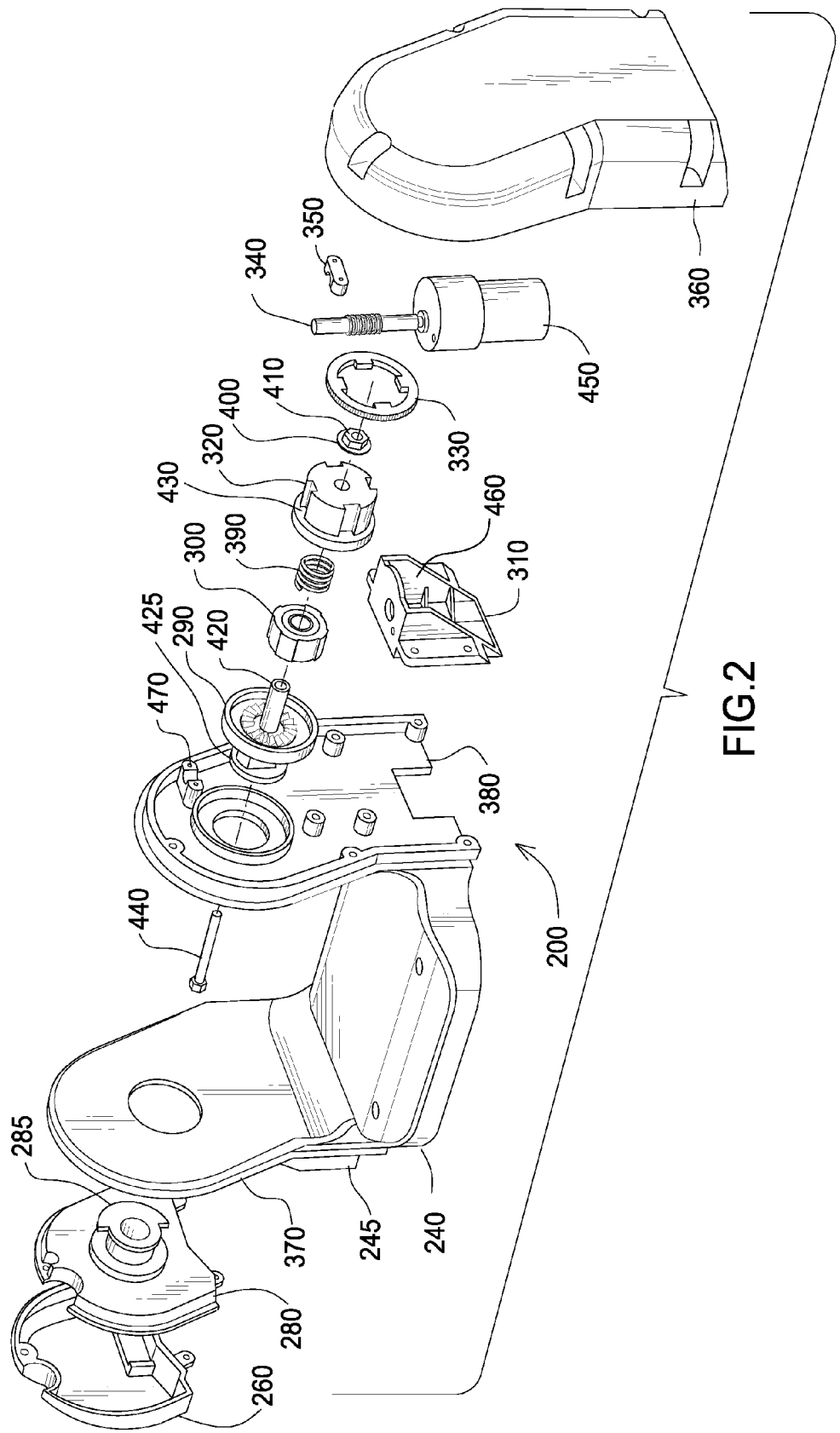
FIG. 2 is an exploded view of the yoke assembly of the platform of FIG. 1.

Turning next to FIG. 2, an exploded view of yoke assembly 200 is shown. Yoke assembly 200 provides pan and tilt ability for the housing assembly 500. In the depicted embodiment, the tilt pivot is integrated with the box that holds the electronics. Upper yoke 240 has two arms 370, 380. A first arm 370 includes housing inner shell 280 and housing outer shell 260. Housing inner shell 280 includes fixed pivot 285.

Vertical gear profile 290 mounts in second arm 380. Vertical gear profile 290 includes protrusion 420 and shaft 425. A screw 440 is inserted through protrusion 420. A vertical gear clutch disk 300 mounts on protrusion 420. Spring 390 is mounted on protrusion 420, immediately adjacent to vertical gear clutch disk 300. In use, spring 390 holds the clutch in an engaged condition. Vertical gear base 320 then mounts onto protrusion 420, covering vertical gear clutch disk 300 and spring 390. Vertical gear base 320 has a lip 430. A vertical gear 330 is mounted over vertical gear base 320 and rests on lip 430. A washer 400 and nut 410 are then placed on screw 440, capturing the intervening parts. While a screw, nut and washer are depicted as the method for attaching the foregoing parts to second arm 380, one skilled in the art would understand that other methods could be used and still be within the scope of the disclosure.

A vertical motor cradle 310 is attached to second arm 380 adjacent to vertical gear profile 290. Vertical motor cradle 310 includes void 460. A vertical tilt motor 450 is attached to vertical motor cradle 310. Vertical tilt motor 450 includes worm 340, which protrudes through void 460. In the depicted embodiment, worm 340 is a single thread worm. While a single thread worm is depicted, multi-thread worms could be used and still be within the present disclosure. A worm saddle cap 350 attaches worm 340 to second arm 380 via projection 470. First arm cover 360 supports moving aspects of tilt device and encloses the components in yoke assembly 200.

In use, worm 340 engages vertical gear 330. When vertical tilt motor 450 causes worm 340 to rotate, vertical gear 330 also rotates, causing housing assembly 500 to tilt vertically. Vertical gear clutch disk 300 allows manual movement of housing assembly 500 up and down without harm. The depicted embodiment allows the optical means of housing assembly 500 to rotate vertically in an approximately 135 degree arc from 45 degrees+ down from horizontal to 0 degrees (straight up) and any position in between. The combination of the continuous horizontal rotation and the large arc of vertical rotation allows a user to direct either optical means to just about any direction around the vehicle or other device the light is mounted on to see a desired object. The only areas the optical means could not be pointed towards are highly likely to be the body of the vehicle the optical system is mounted on. This eliminates potential "blind spots" of some of the prior art devices where a user could not point the optical means in a chosen line of sight direction without turning the vehicle.

Figure 3:
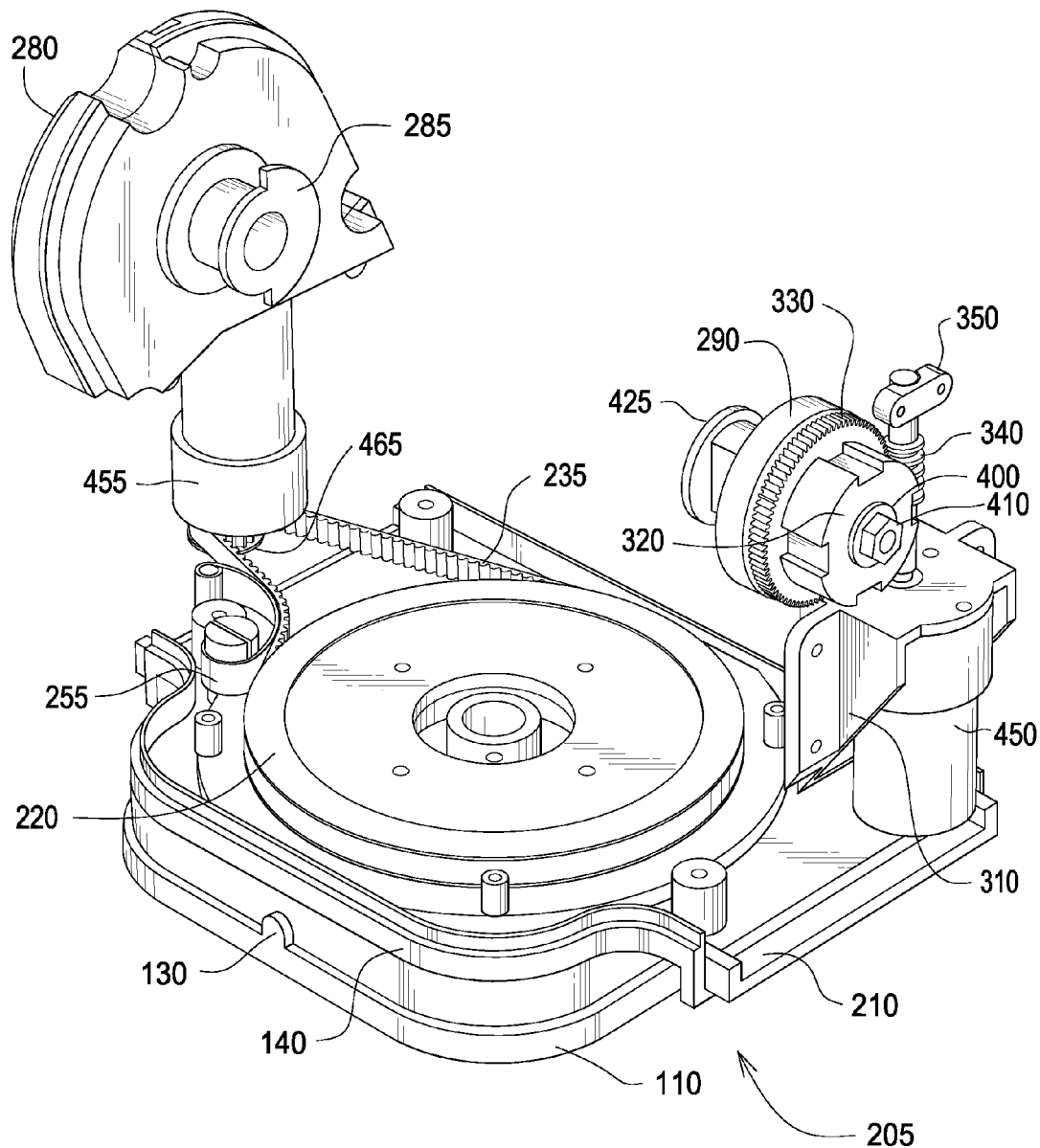
FIG. 3 is a front perspective view of the partially assembled yoke assembly of a second embodiment of the rotating/tilting platform and mounting system of the present application.

Turning next to FIG. 3, an alternate yoke assembly 205 is shown. In this embodiment, base assembly 100 remains the same as that disclosed in FIG. 1. Base plate 120 rests on a gasket 110. Gasket 110 includes flaps 130 which cover the screws used to attach the base to the base. A base 140 is mounted on top of base plate 120. A wiper bearing 150 is mounted on base 140. In use, wiper bearing 150 wipes the bearing surface clean as it rotates. Because of its unique design, the bearing cleans both bearing surfaces and maintains proper compression between the base 140 and the entire upper assembly beginning with the lower yoke 210.

In use, base plate 120 is permanently attached to a vehicle by four screws (not shown). While screws are described, one having an ordinary level of skill in the art will understand that alternate fasteners could be used and still be within the scope of the disclosure. The entire assembled device is attached or removed easily by use of the four lateral screws into the base plate 120. The unit is then hardwired to the vehicle and operated using a joystick (not shown). Alternatively, a radio receiver and transmitter can be used to communicate with the unit. In the depicted embodiment, gasket 110 comprises rubber. One having an ordinary level of skill in the art will understand that other materials having similar properties to rubber could be substituted. In the depicted embodiment, base 140 comprises carbon fiber filled plastic. In the depicted embodiment, the plastic is acrylonitrile butadiene styrene (ABS). One skilled in the art will understand that other materials having similar strength and durability to carbon fiber filled plastic could be substituted and still be within the scope of the disclosure. In the depicted embodiment, wiper bearing 150 comprises a very high molecular weight polyethylene. One having an ordinary level of skill in the art will understand that other materials having similar properties to polyethylene are contemplated by this disclosure.

Yoke assembly 205 comprises a lower yoke 210, which sits on top of wiper bearing 150. Horizontal gear 220 is attached to lower yoke 210 by four screws (not shown). While screws are depicted, one having ordinary skill in the art will understand that alternate fasteners could be used within the scope of the present disclosure. Lower yoke 210 and wiper bearing 150 are compressed and held together by the four screws holding down horizontal gear 220. Belt 235 is mounted over horizontal gear 220. A belt tensioner 255 is mounted on lower yoke 210 adjacent to horizontal gear 220 and belt 235. A horizontal motor 455 with an integral sprocket 465 is mounted in upper yoke 240 in contact with housing inner shell 280 and housing outer shell 260. Electronics, speed control and radio receiver are located inside the enclosure formed by housing outer shell 260, housing inner shell 280 and fixed pivot 285. Second arm cover 365 encloses housing outer shell 260, housing inner shell 280 and fixed pivot 285 in yoke assembly 200. Upper yoke 240 engages with base 140 to enclose all the parts in between. Housing assembly 500 mounts in upper yoke 240.

In use, the entire assembly rotates around horizontal gear 220. Power is supplied from horizontal motor 455 to belt 235 through sprocket 465. Belt 235 engages horizontal gear 220, thereby rotating the entire yoke assembly 205, including housing assembly 500. Belt tensioner 255 maintains proper tension on belt 235 as it transfers power from horizontal motor 455 to horizontal gear 220 and prevents belt slippage.

In the depicted embodiment, horizontal motor 455 is either a 12 v DC or 24 v DC motor and sprocket 465 is a 16 groove sprocket. In the depicted embodiment, belt 235 is a 3 millimeter pitch, 0.24 inch wide HTD belt. In the depicted embodiment, horizontal gear 220 is a 120 groove gear. One having an ordinary level of skill will understand that other components having similar properties to those specifically described could be used and still be within the scope of the present disclosure. In use, the grooves on belt 235 interact with the grooves on horizontal gear 220. This interaction provides a more uniform distribution of shear stresses within the teeth and a transition of tooth loads to the tensile members in the belt. The addition of belt tensioner 255 ensures that belt 235 is correctly tensioned, which prevents slippage and allows belt 235 to run at constant speed. Optionally, a clutch device may be added on the end of horizontal motor 455.

In the depicted embodiment, yoke assembly 205 can rotate 360° continuously. The depicted embodiment includes an optional speed feature, which allows a user to select the speed of the rotation. A set screw (not shown) in base 140 holds a slip ring (not shown) with two wires (not shown) on each side. In the depicted embodiment, horizontal motor 455 has a fixed pivot 285. Fixed pivot 285 can house radio control or a home position electronic component, for example. A home position electronic component would allow a user to select a position in the horizontal rotation of yoke assembly 200 and program the unit to return the yoke assembly 200 to the selected position at the push of a button. Fixed pivot 285 is part of a water tight enclosure.

FIG. 3 shows a partially assembled yoke assembly 205 according to the present disclosure. This perspective clearly shows the interaction between sprocket 465 of horizontal motor 455 and belt 235. The location of belt tensioner 255 on lower yoke 210 is shown, as well as its relation to belt 235. The attachment of vertical tilt motor 450 to lower yoke 210. The assembled vertical gear profile 290, vertical gear 330 and vertical gear base 320 interact with worm 340, which is mounted in vertical tilt motor 450 through vertical motor cradle 310. One skilled in the art will understand that the depicted arrangement of the components is not the only possible arrangement.

Figure 4:
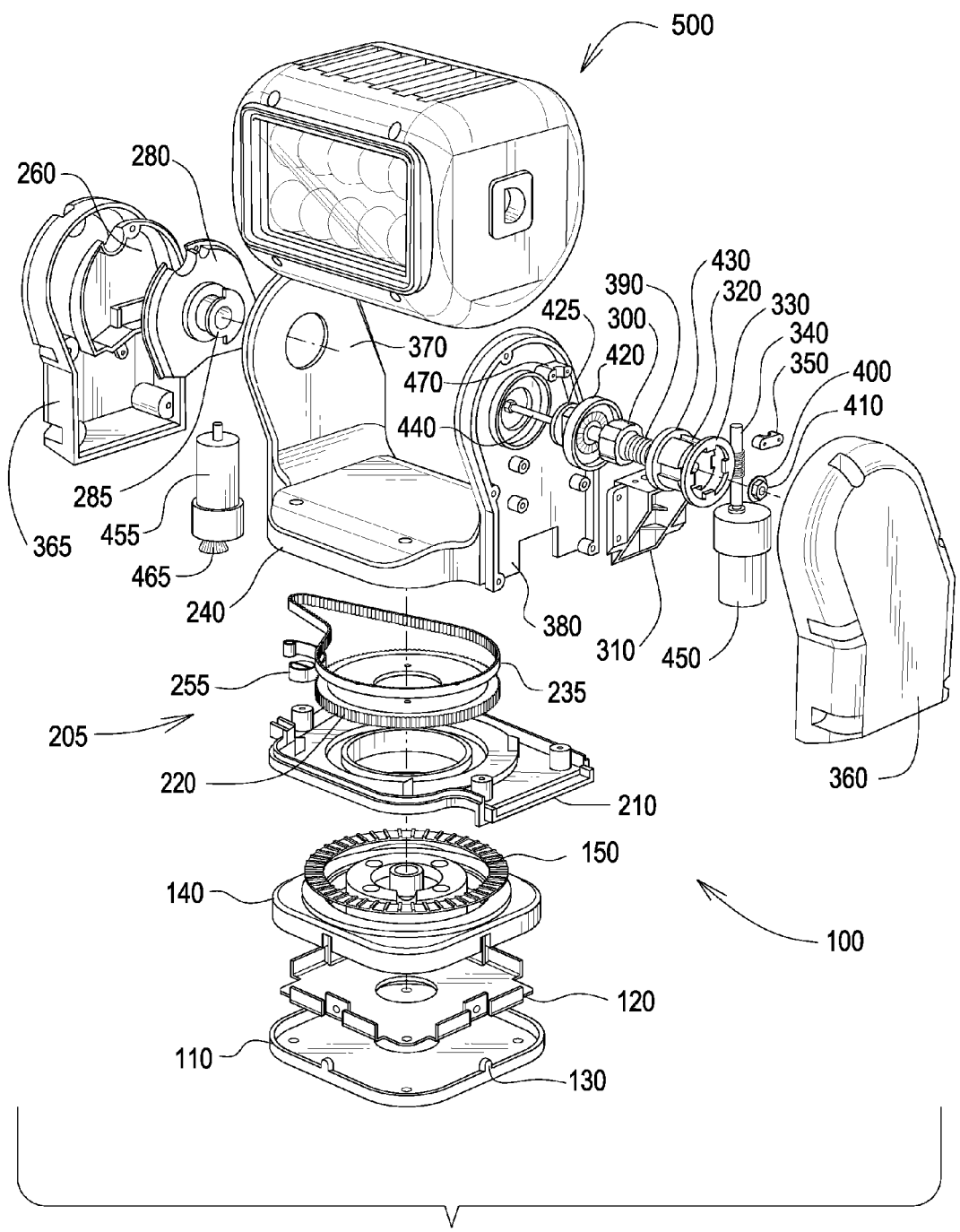
FIG. 4 is an exploded view of FIG. 3.

FIG. 4 also depicts the portion of yoke assembly 205 which provides pan and tilt for the housing assembly 500. In the depicted embodiment, the tilt pivot is integrated with the box that holds the electronics. Upper yoke 240 has two arms 370, 380. A first arm 370 includes housing inner shell 280 and housing outer shell 260. Housing inner shell 280 includes fixed pivot 285.

Vertical gear profile 290 mounts in second arm 380. Vertical gear profile 290 includes protrusion 420 and shaft 425. A screw 440 is inserted through protrusion 420. A vertical gear clutch disk 300 mounts on protrusion 420. Spring 390 is mounted on protrusion 420, immediately adjacent to vertical gear clutch disk 300. In use, spring 390 holds the clutch in an engaged condition. Vertical gear base 320 then mounts onto protrusion 420, covering vertical gear clutch disk 300 and spring 390. Vertical gear base 320 has a lip 430. A vertical gear 330 is mounted over vertical gear base 320 and rests on lip 430. A washer 400 and nut 410 are then placed on screw 440, capturing the intervening parts. While a screw, nut and washer are depicted as the method for attaching the foregoing parts to second arm 380, one skilled in the art would understand that other methods could be used and still be within the scope of the disclosure.

A vertical motor cradle 310 is attached to second arm 380 adjacent to vertical gear profile 290. Vertical motor cradle 310 includes void (not visible). A vertical tilt motor 450 is attached to vertical motor cradle 310. Vertical tilt motor 450 includes worm 340, which protrudes through void 460. In the depicted embodiment, worm 340 is a single thread worm. While a single thread worm is depicted, multi-thread worms could be used and still be within the present disclosure. A worm saddle cap 350 attaches worm 340 to second arm 380 via projection 470. First arm cover 360 supports moving aspects of tilt device and encloses the components in yoke assembly 200.

In use, worm 340 engages vertical gear 330. When vertical tilt motor 450 causes worm 340 to rotate, vertical gear 330 also rotates, causing housing assembly 500 to tilt vertically. Vertical gear clutch disk 300 allows manual movement of housing assembly 500 up and down without harm. The depicted embodiment allows the optical means of housing assembly 500 to tilt from 45 degrees+ down to 0 degrees (straight up) and any position in between.

Figure 5:
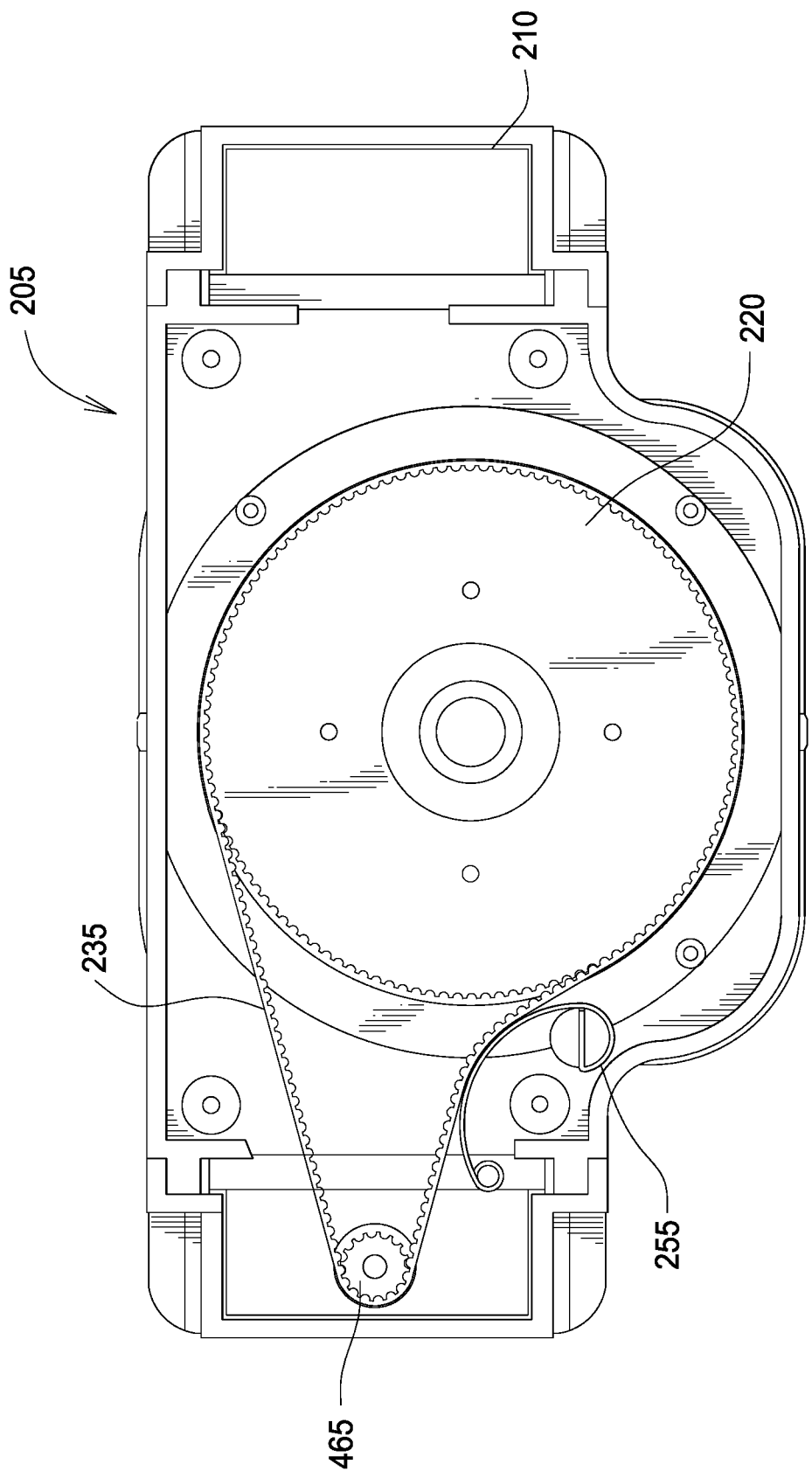
FIG. 5 is a bottom plan view of the yoke assembly of FIG. 3.
Figure 6:
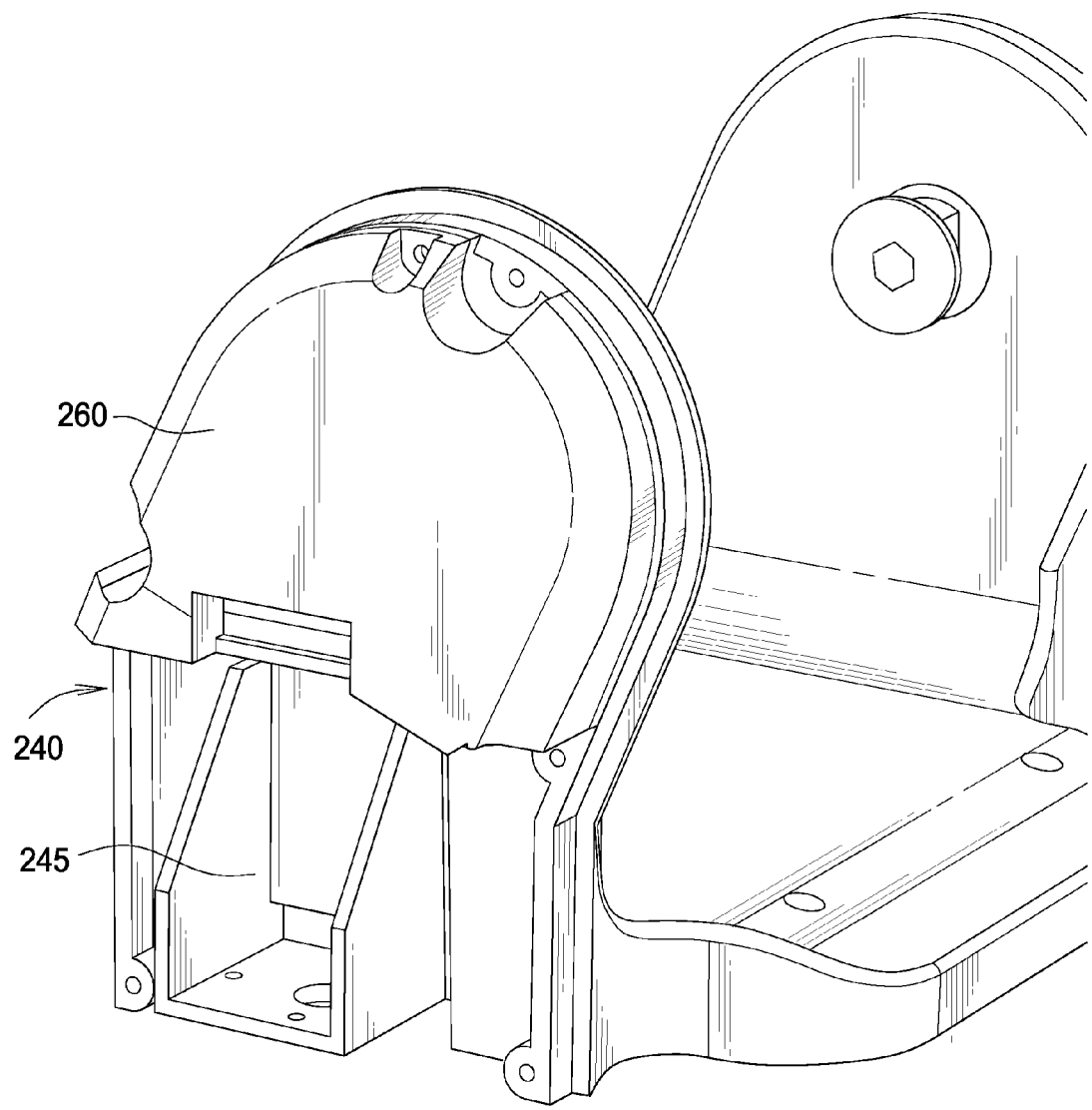
FIG. 6 is a perspective view of the yoke of FIGS. 2 and 3.
Figure 7:
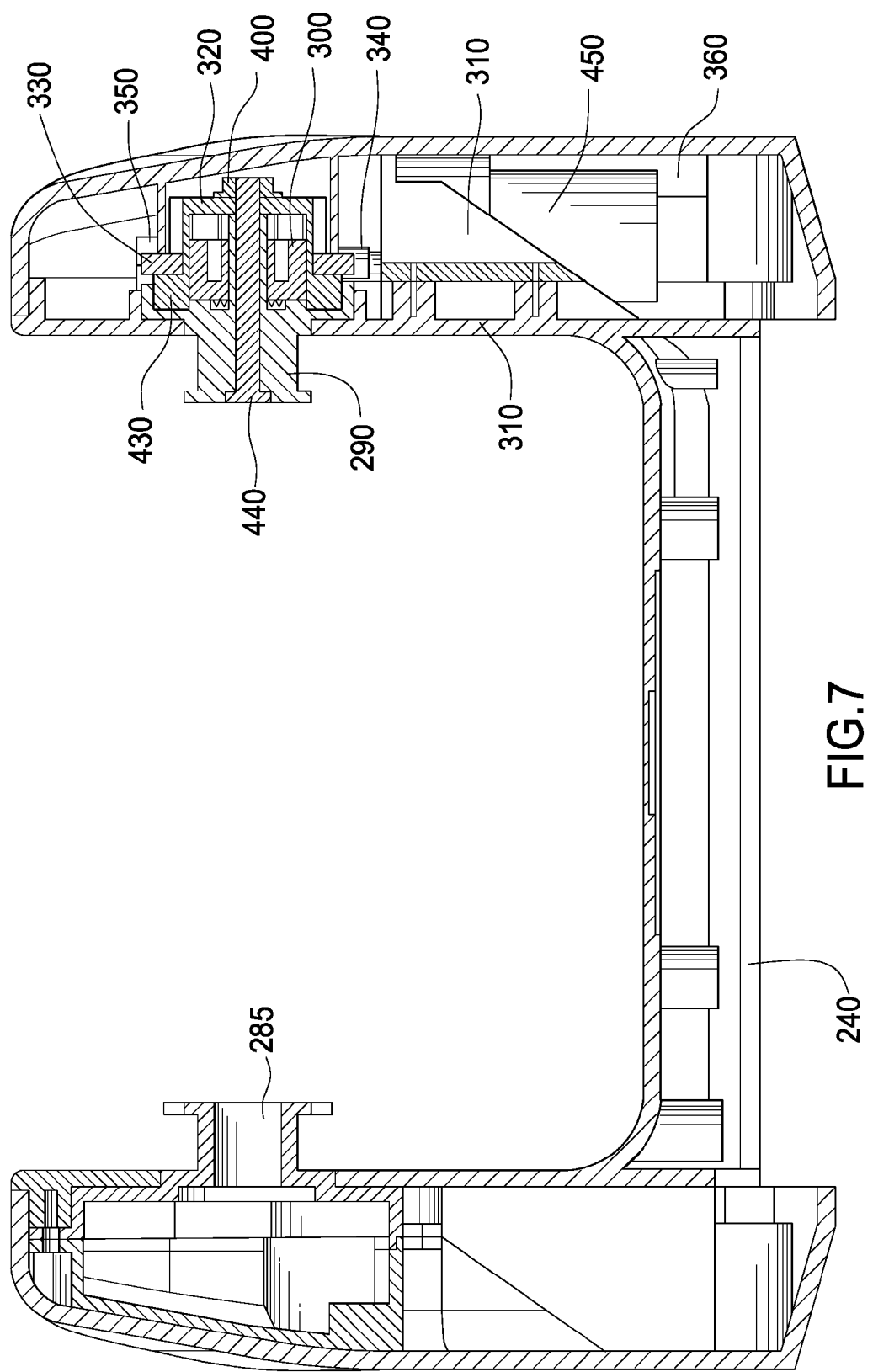
FIG. 7 is a front view of FIG. 6.
Figure 8:
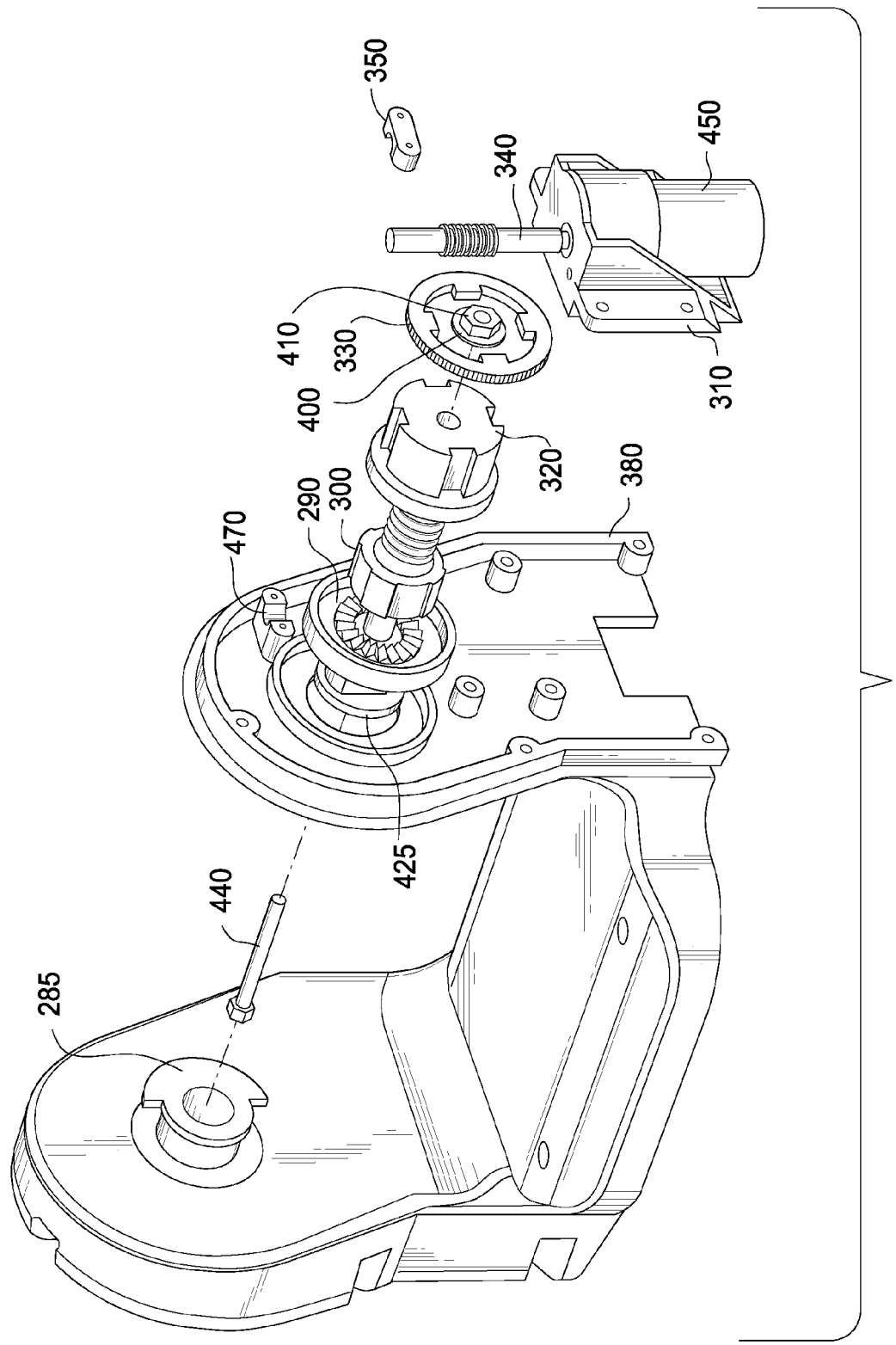
FIG. 8 is an exploded view of the worm gear tilt assembly of FIGS. 2 and 3.
Figure 9:
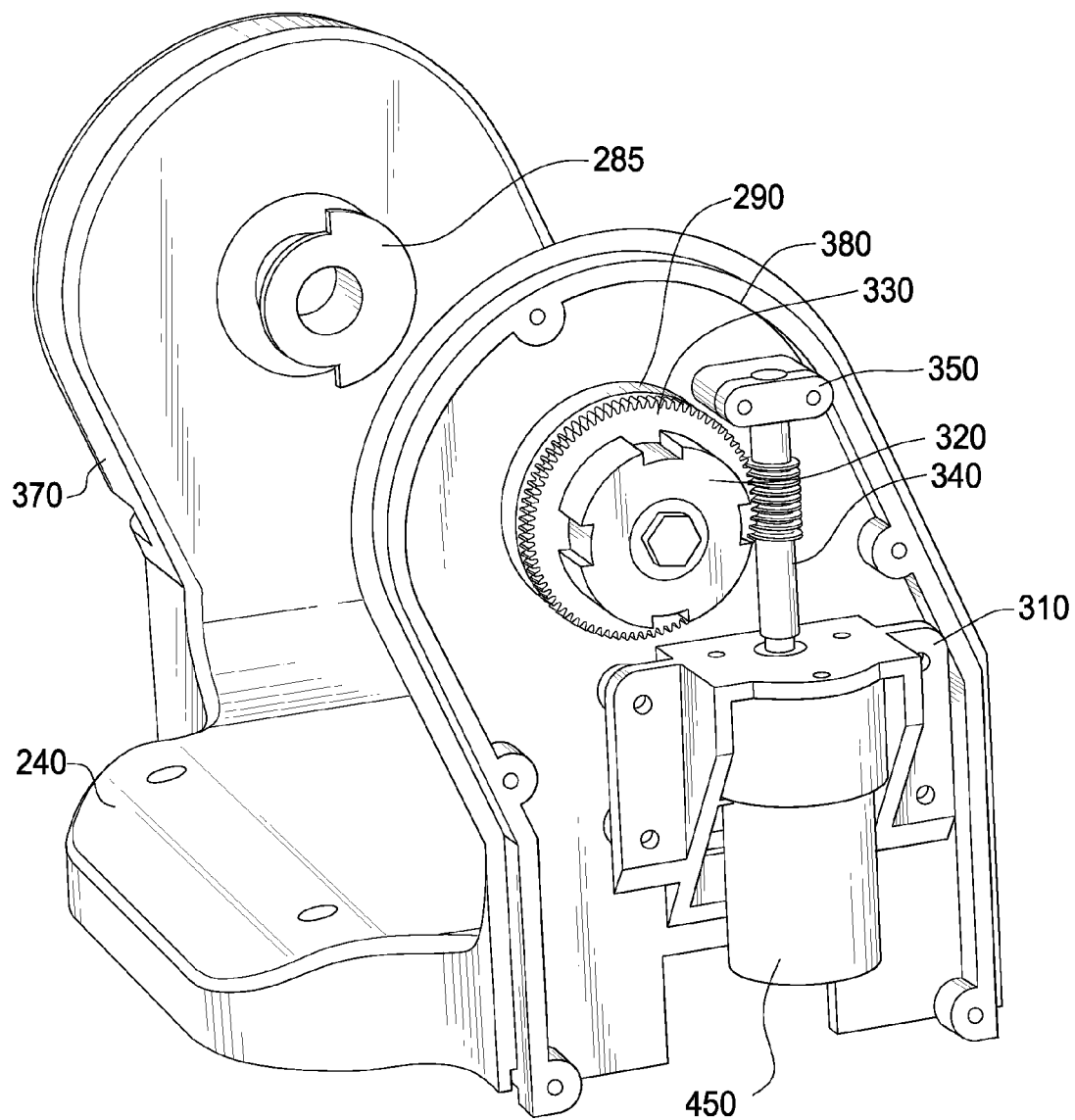
FIG. 9 is an assembled view of the worm gear assembly FIGS. 2 and 3.

FIG. 5 is a bottom plan view of yoke assembly 205. This view shows the arrangement of horizontal gear 220, belt 235, socket 465 and belt tensioner 255. Optionally, a horizontal gear clutch (not shown) may be provided between horizontal gear 220 and base 140. Horizontal gear clutch comprises a series of spur teeth and springs laterally placed around the central axis. As previously noted, the depicted arrangement is one of multiple possible arrangements, and the present disclosure is not limited to the depicted embodiment.

FIGS. 6-9 provide additional views which clarify the interaction of the components.

Figure 10:
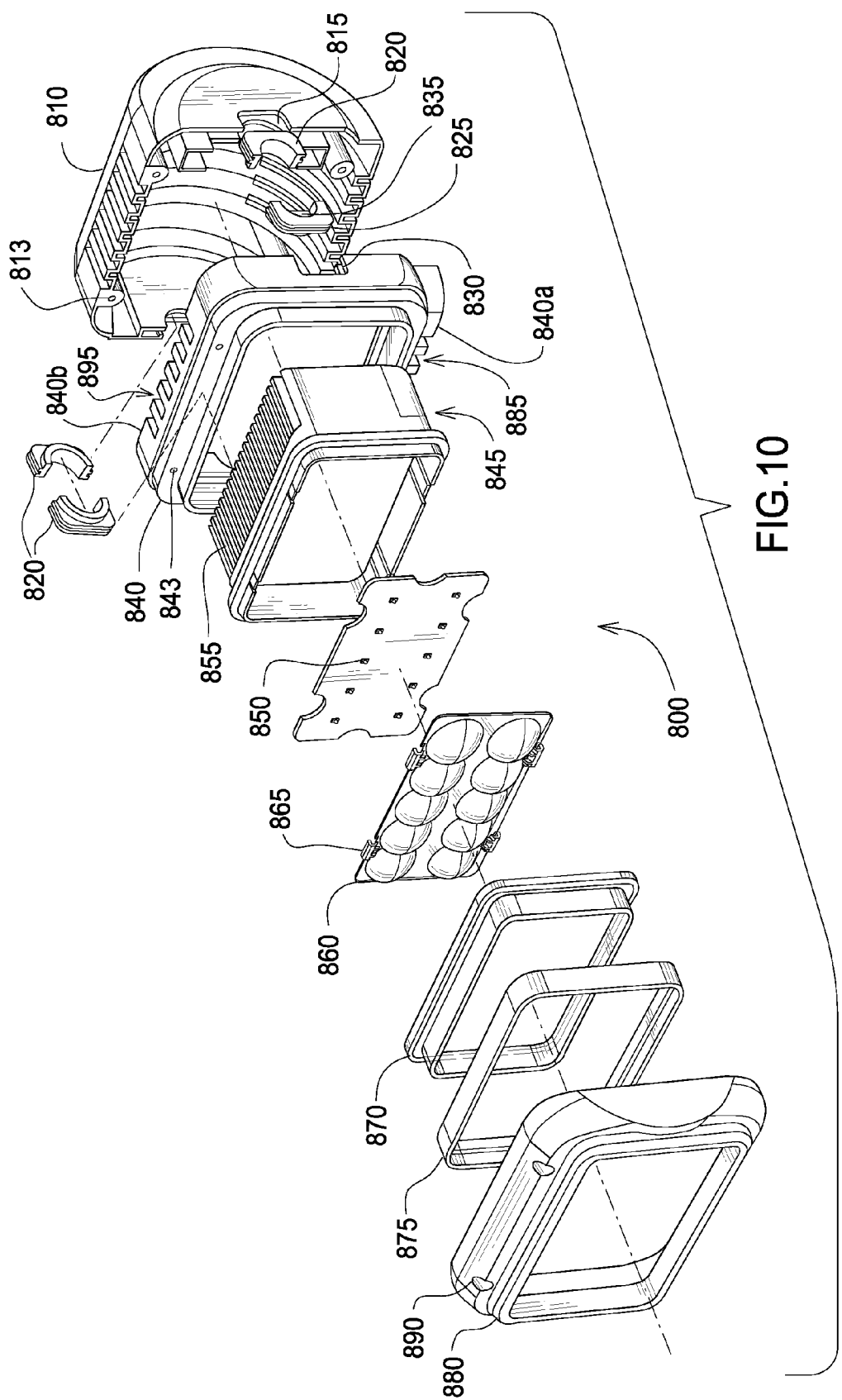
FIG. 10 is an exploded view of the lamp housing assembly of FIGS. 1 and 4 featuring LED lights.

Turning next to FIG. 10, an exploded view of a first embodiment 800 of housing assembly 500 is shown. First embodiment 800 is comprised of a rear housing 810 and a front housing 840. In the depicted embodiment, rear housing 810 and a front housing 840 comprise aluminum with either a powder coat or painted finish. One having an ordinary level of skill in the art will understand that other materials having similar properties to aluminum could be used. A rear housing 810 includes a first notch 815, which is sized to accept a complimentary-shaped bearing 820. An opposing bearing 825 mounts in a second notch 830 in front housing 840. Another set of bearings 820 is mounted on the opposite side of rear housing 810 and front housing 840. In the depicted embodiment, bearing 825 has a flat portion 835 and bearing 820 does not have a flat portion. When rear housing 810 and front housing 840 are attached, bearing 825 interacts with fixed pivot 285 and vertical gear profile 290 in yoke assembly 200 to allow housing assembly 800 to tilt vertically. In use, the flat portion 835 of bearing 825 allows the tilt force to be transferred to the assembly.

Front housing 840 encloses a heat sink 845 comprising fins 855. The design of fins 855 is based on specific heat dissipation requirements of the LED array under specified conditions. There is also accommodation for a fan to force the natural convection when the ambient temperature is extreme. In the depicted embodiment, heat sink 845 is comprised of aluminum. One having an ordinary level of skill in the art will understand that other materials having similar properties to aluminum could be used.

A set of light emitting diodes (LEDs) 850 is mounted on top of heat sink 845. In the depicted embodiment, 10 LEDs are shown. A person having an ordinary level of skill in the art will understand that the number of LEDs is variable. In the depicted embodiment, LEDs 850 are mounted in metal core printed circuit board (MCPCB) 855. While MCPCB is depicted, one having an ordinary level of skill in the art will understand that other materials with similar properties could be substituted. In the depicted embodiment, the LEDs are Luxeon star LEDs. A person having ordinary skill in the art will understand that other brands and types of LEDs could be substituted for Luxeon LEDs.

A lens 860 is mounted over LEDs 850. In the depicted embodiment, lens 860 is a multiple plano convex type optic used as a super projector that collects then combines the output of the multiple LEDs into a single spotlight beam. Lens 860 includes tabs 865, which interact with front housing 840 to hold lens 860 in place. In the depicted embodiment, lens 860 is made of acrylic, and is molded as a single piece. LEDs 580 are joined to front housing 840 with a silicone pad. Silicone provides excellent heat transfer to assist in the convection cooling of LEDs 850. Those having an ordinary level of skill in the art will understand that other materials having similar properties to silicone could be used, and that multiple lenses could be manufactured and later attached to one another or to the MCPCB.

An outer protective lens cover 870 mounts over lens 860. In the depicted embodiment, lens cover 870 is comprised of polycarbonate. One having an ordinary level of skill in the art will understand that materials having similar properties to polycarbonate, such as acrylic, could be used. A bezel gasket 875 mounts over lens cover 870. A bezel 880 mounts over bezel gasket 875. Bezel 880 attaches to front housing 840 by inserting screws (not shown) through voids 890 in bezel 880, voids 843 in front housing 840, and finally voids 813 in rear housing 810, thereby enclosing all intervening parts. While the depicted embodiment uses screws to attach bezel 880 to front housing 840 rear housing 810, other means of attachment known to those having an ordinary level of skill in the art could be used. In the depicted embodiment, bezel 880 comprises a plastic infrared material. One having an ordinary level of skill in the art will understand that similar materials could be substituted.

When first embodiment 800 is assembled, openings 885 in the bottom 840*a* of front housing 840 allow air to enter first embodiment 800. Air enters openings 885, travels under the bottom 840*a* of front housing 840, travels behind rear housing 810, over fins 855 of heat sink 845, flows over the top 840*b* of front housing 840, and exits through openings 895 in the top 840*b* of front housing 840, allowing for convection and air cooling.

Figure 11:
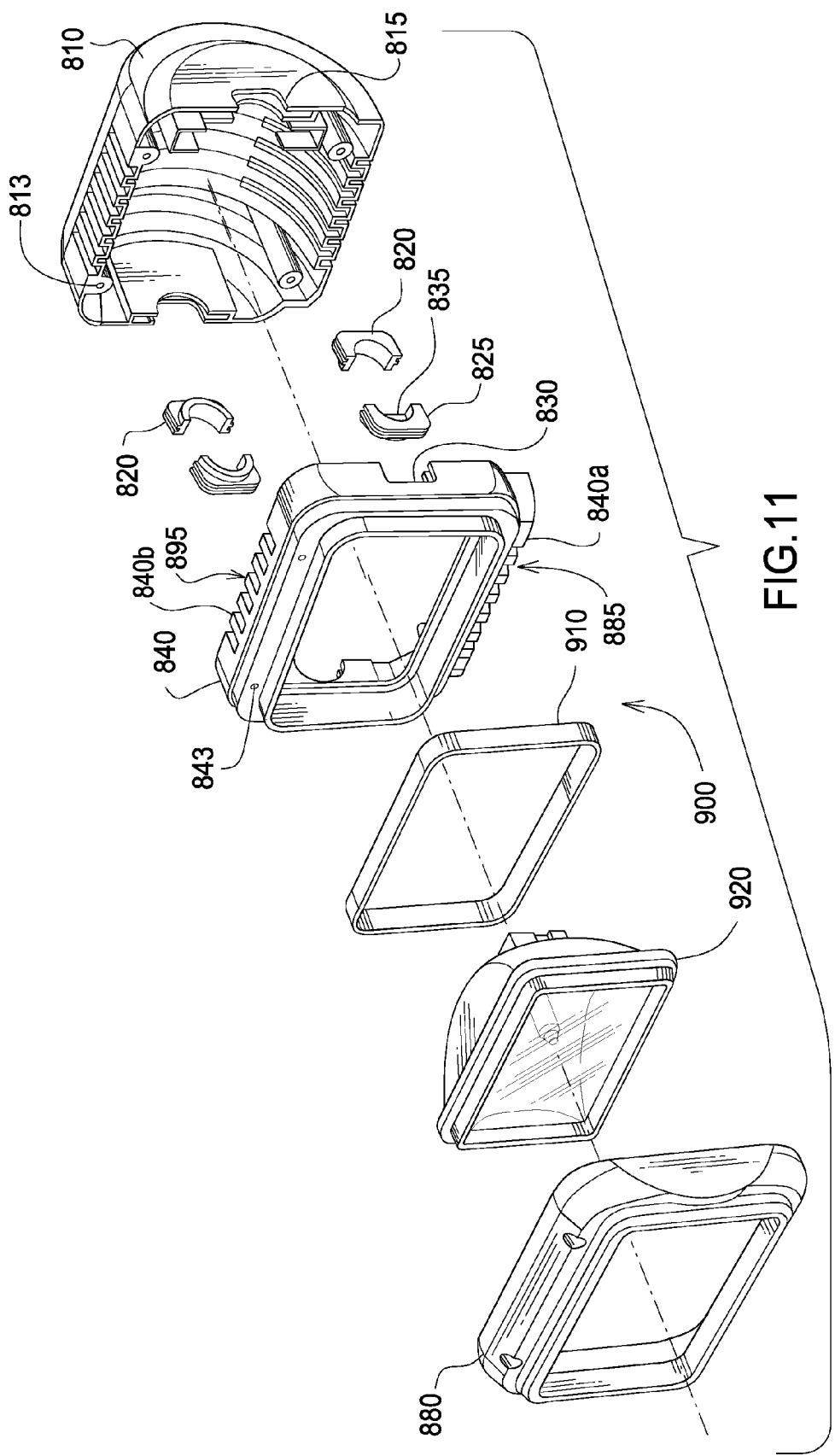
FIG. 11 is an exploded view of an alternate lamp housing assembly featuring a halogen lamp.

Turning next to FIG. 11, a second embodiment 900 of housing assembly 500 is shown. In this embodiment, rear housing 810, bearings 820 and 825, front housing 840 and bezel 880 remain the same as those described in relation to first embodiment 800. However, second embodiment 900 uses a halogen lamp 920 as its light source. A rear gasket 910 supports halogen lamp in front housing 840.

Figure 12:
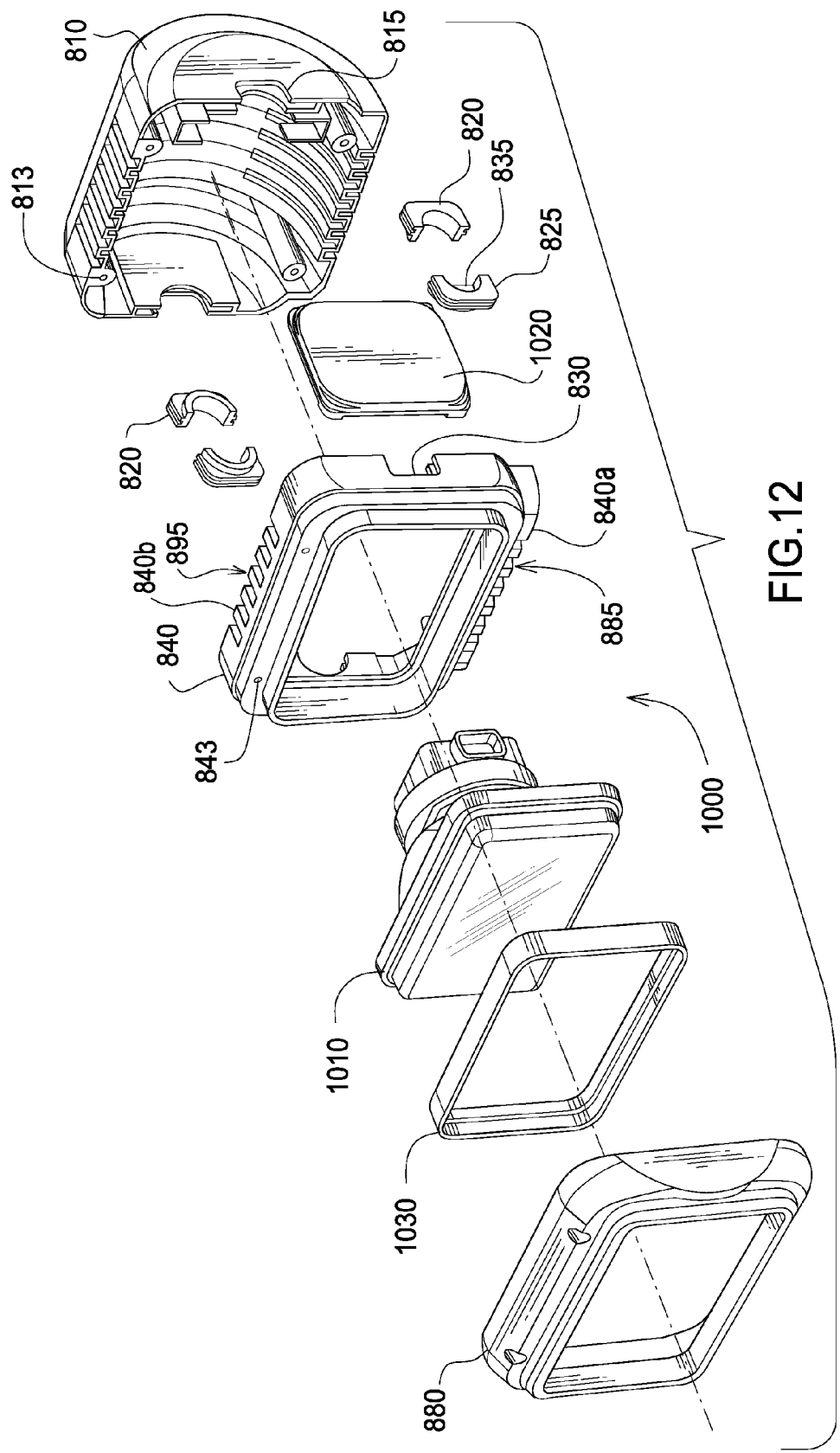
FIG. 12 is an exploded view of an alternate lamp housing assembly featuring an HID lamp.

Turning next to FIG. 12, a third embodiment 1000 of housing assembly 500 is shown. In this embodiment, rear housing 810, bearings 820 and 825, front housing 840 and bezel 880 remain the same as those described in relation to first embodiment 800. In contrast to first embodiment 800, third embodiment 1000 uses a high-intensity discharge (HID) lamp 1010 as its light source. A ballast 1020 provides power to HID lamp 1010. A bezel gasket 1030 is mounted between HID lamp 1010 and bezel 880.

Figure 13:
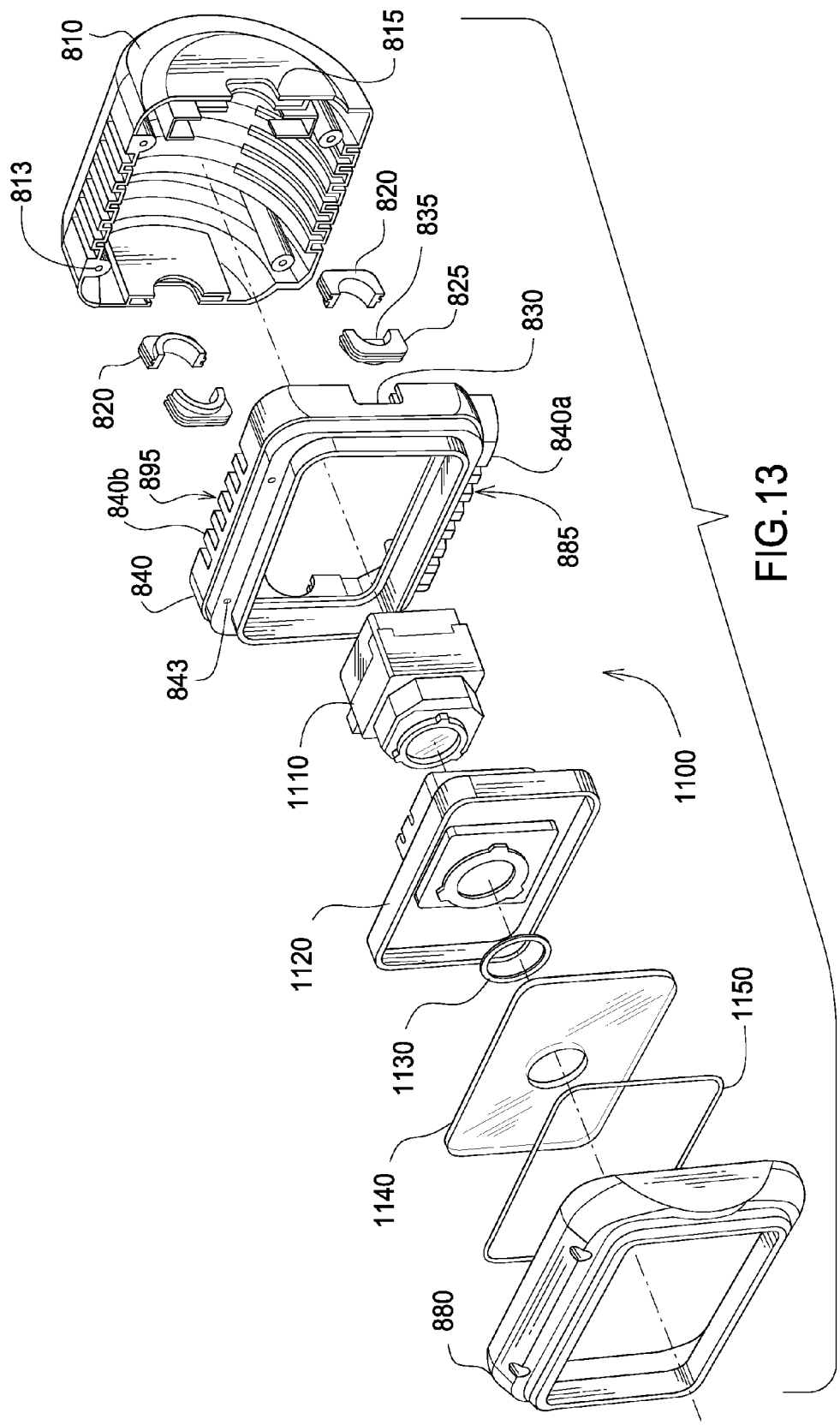
FIG. 13 an exploded view of an alternate housing assembly featuring an infrared camera.

Turning next to FIG. 13, a fourth embodiment 1100 of housing assembly 500 is shown. In this embodiment, rear housing 810, bearings 820 and 825, front housing 840 and bezel 880 remain the same as those described in relation to first embodiment 800. Fourth embodiment 1100 includes a night vision infrared camera 1110. A bracket 1120 provides support to camera 1110. A first gasket 1130 is mounted between camera 1110 and infrared camera glass 1140. A second gasket 1150 is mounted between infrared camera glass 1140 and bezel 880.

Maintaining the same rear housing 810, bearings 820 and 825, front housing 840 and bezel 880 for each housing assembly allows a number of different optical means, such as LED lights, halogen lamps, HID lamps and infrared cameras, to be used with the same base assembly 100 and yoke assembly 200. The system is advantageous because it minimizes costs in parts and tooling needed for four separate systems. Moreover, a manufacturer or other seller can easily and rapidly assemble a chosen optical device into the housing based upon consumer demand. Instead of stocking four complete systems, a manufacturer or other seller need only stock one base assembly, one yoke assembly, one housing, and the desired optical devices. When an order is placed, the manufacturer need only mount the desired optical device into the housing, mount the housing in the yoke assembly and send the rotatable housing and mounting platform to the customer.

The entire assembly is water tight, regardless of the selected housing assembly 500. The depicted unit, once assembled, has an Ingress Protection rating, or IP code, of IP 65 or better, meaning that the unit is totally protected against dust and protected against low pressure water jets from any direction; limited water ingress is permitted. Water proof connectors protect against any water that does enter the unit. The depicted unit can be produced to be as a 24 v DC unit or as a 12 v DC unit. The depicted unit is MIL-STD-461F compliant.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

We claim:

1. A rotatable mounting system for an optical device for mounting on a vehicle comprising:
   a base gasket;
   a base plate mounted on said base gasket;
   a base mounted on said base plate;
   a bearing rotatably mounted on said base;
   a lower yoke mounted over said bearing;
   a horizontal gear rotatably mounted to said lower yoke;
   an upper yoke mounted over said horizontal gear;
   said upper yoke comprising a first arm and a second arm;
   said first arm comprising a horizontal motor;
   said second arm comprising a vertical tilt motor;
   an optical device housing;
   said optical device housing pivotally connected to said first arm and said second arm; and
   means for said vertical motor to tilt said housing vertically through an arc of about 135 degrees;
   wherein said means for said vertical motor to tilt said housing comprises a vertical gear and a worm;
   wherein said worm is connected to said vertical motor; and
   wherein said worm interacts with said vertical gear.

2. The rotatable mounting system of claim 1, further comprising means for said horizontal motor to turn said horizontal gear in a continuous 360 degree motion.

3. The rotatable mounting system of claim 1, further comprising means to reverse the rotational direction of said horizontal gear.

4. The rotatable mounting system of claim 1, further comprising a vertical motor cradle.

5. The rotatable mounting system of claim 1, wherein:
   said means for said vertical motor to tilt said housing means vertically further comprises a vertical gear clutch disk; and
   wherein said vertical gear clutch disk allows the housing to be manually adjusted.

6. The rotatable mounting system of claim 1, wherein said means for said horizontal motor to turn said horizontal gear comprises:
   said horizontal motor further comprises a pinion;
   said pinion contacts an idler gear;
   said idle gear interacts with said horizontal gear to turn said horizontal gear;
   wherein the turning of said horizontal gear causes said mounting system to rotate horizontally.

7. The rotatable mounting system of claim 1, wherein said means for said horizontal motor to turn said horizontal gear comprises:
   said horizontal motor further comprises a groove sprocket;
   a belt rests on said horizontal gear; and
   said sprocket interacts with said belt to turn said horizontal gear;
   wherein the turning of said horizontal gear causes said mounting system to rotate horizontally.

8. The rotatable mounting system of claim 1, wherein said bearing further comprises;
   a wiper bearing; and
   wherein said wiper bearing wipes the bearing surface clean as it rotates.

9. The rotatable mounting system of claim 1, wherein said optical device housing comprises:
   a rear housing;
   a front housing;
   a bezel; and
   an optical device mounted in said optical device housing.

10. The rotatable mounting system of claim 9, wherein said optical device comprises:
    a heat sink;
    a length of printed circuit board mounted to said heat sink;
    at least one light-emitting diode mounted to said printed circuit board;
    a lens mounted over said printed circuit board; and
    said bezel connecting said lens and said heat sink to said front housing.

11. The rotatable mounting system of claim 9, wherein said optical device comprises:
    a halogen lamp gasket;
    a halogen lamp; and
    said bezel connecting said halogen lamp halogen lamp to said front housing.

12. The rotatable mounting system of claim 9, wherein said optical device comprises:
    a high-intensity discharge lamp;
    a ballast powering said high-intensity discharge lamp; and
    said bezel connecting said high-intensity discharge lamp to said front housing.

13. The rotatable mounting system of claim 9, wherein said optical device comprises:
    a night vision infrared camera;
    a bracket supporting said night vision infrared camera; and
    said bezel connecting said night vision infrared camera to said front housing.

14. The rotatable mounting system of claim 9, wherein said optical device is selected from the group consisting of light-emitting diodes, high-intensity discharge lamps, halogen lights, cameras, infra red devices and heat sensitive devices.

15. The rotatable mounting system of claim 9, wherein said optical device is interchangeably mounted in said optical device housing.

16. The rotatable mounting system of claim 1 further comprising:
    a home button;
    wherein a user selects a point in the horizontal rotation to which the unit will return at the touch of a button.

* * * * *